(12) United States Patent
Hashimoto et al.

(10) Patent No.: US 7,187,260 B2
(45) Date of Patent: Mar. 6, 2007

(54) ELECTROMAGNETIC DEVICE WITH COVER FOR PREVENTION OF DAMAGE TO CONDUCTOR OF ELECTROMAGNETIC DEVICE

(75) Inventors: Naoyo Hashimoto, Tokyo (JP); Teruo Miyaoku, Tokyo (JP); Shiro Hasegawa, Tokyo (JP); Chiaki Sugano, Tokyo (JP); Hiromasa Ozawa, Tokyo (JP); Hirohisa Ohta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 578 days.

(21) Appl. No.: 09/961,273

(22) Filed: Sep. 25, 2001

(65) Prior Publication Data

US 2002/0050899 A1    May 2, 2002

(30) Foreign Application Priority Data

Oct. 30, 2000    (JP) .............................. 2000-330749

(51) Int. Cl.
*H01F 7/00*    (2006.01)
(52) U.S. Cl. ...................................... 335/299; 310/257
(58) Field of Classification Search ................ 335/299, 335/296; 336/208, 196; 310/257, 43, 49 R, 310/80, 12
See application file for complete search history.

(56) References Cited

U.S. PATENT DOCUMENTS

| | | | | |
|---|---|---|---|---|
| 3,539,960 A | | 11/1970 | Young | |
| 3,676,814 A | * | 7/1972 | Trunzo et al. | 336/205 |
| 3,851,830 A | * | 12/1974 | Barthalon | 336/208 |
| 4,041,430 A | * | 8/1977 | Hrynewycz | 336/92 |
| 4,942,325 A | * | 7/1990 | Fukaya | 310/257 |
| 5,153,550 A | | 10/1992 | Sugiura et al. | |
| 5,202,187 A | * | 4/1993 | Ghorashi et al. | 428/379 |
| 5,263,647 A | * | 11/1993 | Cerny et al. | 239/585.1 |
| 5,476,229 A | * | 12/1995 | Ishikawa | 242/174 |
| 5,512,867 A | * | 4/1996 | Shibuta et al. | 335/216 |
| 5,979,760 A | * | 11/1999 | Freyman et al. | 235/454 |
| 6,221,297 B1 | * | 4/2001 | Lanoue et al. | 264/219 |
| 6,310,533 B2 | * | 10/2001 | Coulombier | 336/90 |
| 6,535,095 B2 | * | 3/2003 | Aoki et al. | 336/83 |
| 2004/0201297 A1 | * | 10/2004 | Chen | 310/89 |

(Continued)

FOREIGN PATENT DOCUMENTS

GB    867987    5/1961

(Continued)

OTHER PUBLICATIONS

Patent Abstracts of Japan, vol. 2000, No. 02, Feb. 29, 2000.

(Continued)

*Primary Examiner*—Elvin G. Enad
*Assistant Examiner*—Bernard Rojas
(74) *Attorney, Agent, or Firm*—Sughrue Mion, PLLC

(57) ABSTRACT

A stepping motor according to the present invention used in a case containing oil includes a motor having a coil formed with a conductor wound around a bobbin and a cover member enclosing the coil, and a housing which houses the motor. The cover member serves to protect the coil from being directly subjected to molding pressure when the housing is injection-molded.

13 Claims, 6 Drawing Sheets

U.S. PATENT DOCUMENTS

2005/0046305 A1 * 3/2005 Matsushita et al. ......... 310/257

FOREIGN PATENT DOCUMENTS

| JP | 54-144101 | | 3/1978 |
| JP | 57080709 A | * | 5/1982 |
| JP | 60206113 A | * | 10/1985 |
| JP | 03-032197 | | 9/1991 |
| JP | 5-276710 | | 10/1993 |

OTHER PUBLICATIONS

Patent Abstracts of Japan, vol. 012, No. 168, May 20, 1988.
Patent Abstracts of Japan, vol. 006, No. 055, Apr. 10, 1982.

* cited by examiner

ELECTROMAGNETIC DEVICE WITH COVER FOR PREVENTION OF DAMAGE TO CONDUCTOR OF ELECTROMAGNETIC DEVICE

BACKGROUND OF THE INVENTION

1. Field of the Invention

The present invention relates to an electromagnetic device such as a motor or the like, for example, used in a transmission case containing oil.

2. Description of the Related Art

FIG. 4 is a plan view of the stepping motor 1. FIG. 5 is a sectional view of the stepping motor 1 shown in FIG. 4 along a line V—V. FIG. 6 is a sectional view of the stepping motor 1 shown in FIG. 5 along a line VI—VI. FIG. 7 is a sectional view of the stepping motor 1 shown in FIG. 5 along a line VII—VII. FIG. 8 is a perspective view of a critical portion of the stepping motor 1 shown in FIG. 4.

In the drawings, the permanent-magnet-type stepping motor 1, provided in a transmission case (not shown) containing oil, includes a resin casing 2, a resin cylindrical housing 12 connected with the casing 2, a motor body 3 received in the casing 2, a shaft 4 to be rotated by the motor body 3, and a converting structure for converting the rotational movement of the shaft 4 into linear movement. The casing 2 and the housing 12 form a cover.

In the drawings, the permanent-magnet-type stepping motor 1, provided in a transmission case (not shown) containing oil, includes a resin casing 2, a resin cylindrical housing 12 connected with the casing 2, a motor body 3 received in the casing 2, a shaft 4 to be rotated by the motor body 3, and a converting structure 31 for converting the rotational movement of the shaft 4 into linear movement. The casing 2 and the housing 12 form a cover.

The housing 12 is fixed at a first end thereof to the casing 2 by a plurality of screws 12A extending parallel to the shaft 4. The casing 2 is provided with a circular mating hole 2a formed therein, and the housing 12 is provided with a mating member 12a so as to be inserted in the mating hole 2a. In FIG. 6, the mating member 12a is provided with three positioning-protrusions 12b at the outer periphery of the mating member 12a, the positioning protrusions 12b protruding in the radial directions and in contact with the inner periphery of the mating hole 2a. The housing 12 is provided with an annular groove 12c formed therein at a face in connection with the casing 2.

The housing 12 is provided therein with a housing through-hole 12d communicating between the outside and the inside of the housing 12, the housing through-hole 12d being provided at a side face of the housing 12. A filter 13 for capturing contamination of oil is provided in the housing through-hole 12d. The shaft 4 is rotatably supported by bearings 14 and 15. The bearing 15 affixed in the housing 15 is a rubber-seal-type bearing.

The housing 12 is provided, at a second end thereof opposite to the first end fixed to the casing 2, with a rod 16 which reciprocates along the axis of the shaft 4 with the rotation of the shaft 4. The rod 16 is inserted into the housing 12 at the base end of the rod 16, and the other end of the rod 16 protrudes from the second end of the housing 12. The rod 16 is provided therein with a through-hole 16a communicating between the inside of the housing 12 and the inside of the rod 16. The housing 12 is provided at the inner face of the second end thereof with a sleeve 17 for guiding the rod 16 linearly moving, an oil seal 18 for avoiding contamination to penetrate from the outer periphery of the rod 16, and an annular stopper 19 for restricting the linear movement of the rod 16. The converting structure 31 includes a threaded part 4a of the shaft 4, a resin guide member 20 disposed at the base end of the rod 16 and coupled with the threaded part 4a, and a metallic stopper 21 for restricting the linear movement of the rod 16 at the other side of the annular stopper 19. The guide member 20 and the stopper 21 include stopper faces 20b and 21a, respectively, perpendicular to the rotational axis of the shaft 4. In FIG. 7, the guide member 20 is provided with rotation-restricting protrusions 20a for restricting rotation of the rod 16 formed extending in the radial directions at the outer periphery of the guide member 20. With this arrangement, the guide member 20 is moved in the axial direction of the shaft 4 by the rotation thereof. The rod 16 is mounted with a resin member 22 to be coupled with the first link 101 at the end opposite to the base end of the rod 16.

In the stepping motor 1 having the above-described configuration, when electrical current is applied to the coil 7 via the connectors 25, a rotation-driving magnetic field is generated in the coil 7, thereby rotating the rotor 6 and the shaft 4 as a unit. The shaft 4 is coupled with the guide member 20 at the threaded part 4a of the shaft 4, and the rotational movement of the guide member 20 is restricted, whereby the rotational movement of the shaft 4 is converted into the linear movement of the guide member 20 and the rod 16.

By the linear movement of the rod 16 in both directions, the transmission control valve (not shown) is opened and closed, whereby the ratio of rotational speeds between the driving shaft and the engine shaft varies, as described above.

Since a known stepping motor 1 is used in oil containing sulfur and sulfur compounds, an outer coating of a conductor is damaged by being caused by a fact described below, then a chemical reaction is generated between the sulfur and sulfur compounds and a copper wire of the conductor at a position in which the outer coating of the conductor is damaged, whereby copper of the copper wire dissolves due to the potential gradient between the adjacent copper wires, thereby causing short circuits or disconnection.

(A) When flashes are formed on a bobbin 50, large molding pressure is applied to a motor body 3 when a housing 12 is molded by an injection mold, whereby an outer coating of a conductor is damaged due to the flashes.

(B) When a coil 7 is formed by winding the conductor around the bobbin 50, the outer coating of the conductor is damaged by friction between the bobbin 50 and the conductor.

(C) After the conductor is wound around the bobbin 50, the conductor is adhered to the bobbin with the outer coating being thermowelded on the bobbin 50. Thereafter, the outer coating of the conductor is damaged by a thermal stress generated by the difference of materials between the bobbin 50 and the outer coating.

(D) When the thickness of the outer coating of the conductor is smaller than the size of the flash, a tip of the flash reaches the conductor when the conductor is wound around the bobbin 50, thereby damaging the outer coating of the conductor.

SUMMARY OF THE INVENTION

The present invention aims to solve the above problems and an object of the present invention is to provide an electromagnetic device in which an outer coating of a conductor is prevented from being damaged, and the risk of short circuits and disconnection in the conductor is reduced.

To this end, according to the present invention, there is provided an electromagnetic device used in a case containing oil comprises: an electromagnetic device body including a coil formed with a conductor wound around a bobbin and a cover member enclosing the coil; and a cover for covering the electromagnetic device body, wherein the cover member protects the coil from being directly subjected to molding pressure when the cover is formed by injection molding, by covering the coil.

According to another aspect of the present invention, there is provided
an electromagnetic device used in a case containing oil comprises: a bobbin; and
a conductor wound around the bobbin and coated with an outer coating, wherein the bobbin is composed of a material having lubricating characteristics with respect to the material of the outer coating.

According to still another aspect of the present invention, there is provided an electromagnetic device used in a case containing oil comprises: a bobbin; a conductor wound around said bobbin and coated with an outer coating; and a material having lubricating characteristics deposited on a surface of the bobbin.

According to still another aspect of the present invention, there is provided an electromagnetic device used in a case containing oil comprises:
a bobbin; and
a conductor wound around the bobbin and coated with an outer coating, wherein the thickness of the outer coating of the conductor exceeds the size of a flash produced on the bobbin.

DETAILED DESCRIPTION OF THE PREFERRED EMBODIMENTS

Figure 1:
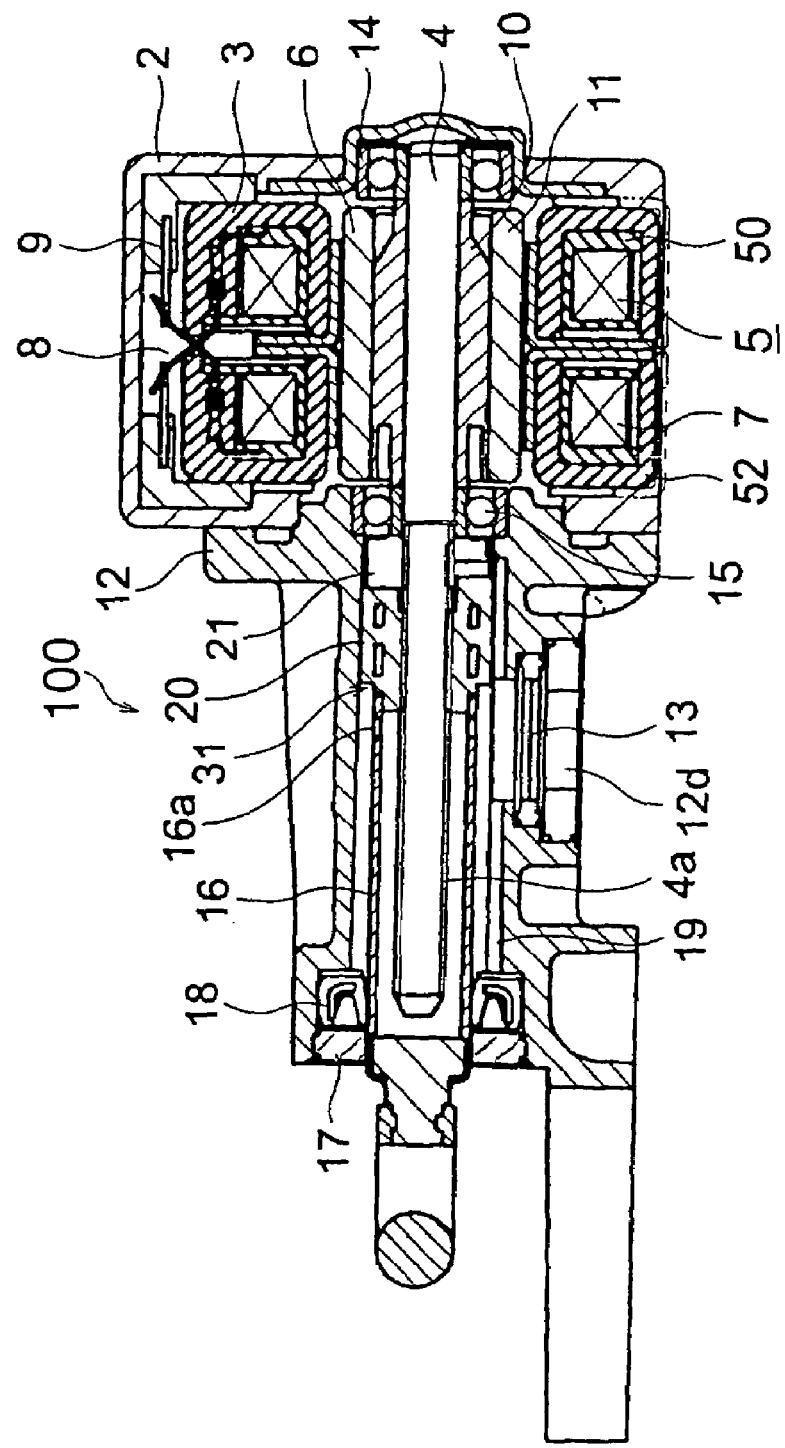
FIG. 1 is a sectional view of a stepping motor according to a first embodiment of the present invention.

First Embodiment
FIG. 1 is a sectional view of a stepping motor 100 used in an electromagnetic device.

The permanent-magnet-type stepping motor 100 housed in a transmission case (not shown) containing oil includes a resin casing 2, a resin cylindrical housing 12 connected to the casing 2 at an end of the housing 12, a motor body 3 which is an electromagnetic device disposed in the casing 2, a shaft 4 to be rotated by the motor body 3 and a converting structure 31 for converting the rotational movement of the shaft into linear movement. The casing 2 and the housing 12 form a cover.

The motor body 3 includes a stator 5 fixed to the casing 2, and a rotor 6 fixed to the shaft 4. The stator 5 includes bobbins 50, a pair of coils 7, each formed with a conductor coated with an outer coating on a copper wire and wound around the bobbin 50, a cover member 52 enclosing the coils 7, coil terminals 8 led out from the coil 7, and connector terminals 9 connected to the coil terminals 8.

Figure 2:
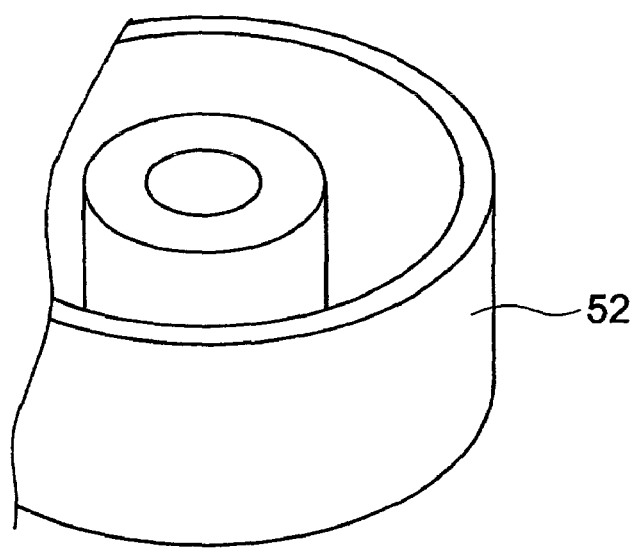
FIG. 2 is a perspective view of a critical portion of a cover member shown in FIG. 1.

The pair of coils 7 opposing each other are enclosed by the cover member 52 having a shape shown in FIG. 2 at three faces of each coil 7 having a rectangular section.

The rotor 6 includes a bush 10 fixed to the shaft 4 and a hollow cylindrical permanent magnet 11 fixed to the bush 10.

The housing 12 is provided therein with a housing through-hole 12d communicating between the outside and the inside of the housing 12, the housing through-hole 12d being provided at a side face of the housing 12. A filter 13 for capturing contamination in oil is provided in the housing through-hole 12d. The shaft 4 is rotatably supported by bearings 14 and 15.

The housing 12 is provided, at an end thereof opposite to the end fixed to the casing 2, with a rod 16 which reciprocates along the axis of the shaft 4 with the rotation of the shaft 4. The rod 16 is inserted into the housing 12 at the base end of the rod 16, and the other end of the rod 16 protrudes from the end of the housing 12. The rod 16 is provided therein with a through-hole 16a communicating between the inside of the housing 12 and the inside of the rod 16. The housing 12 is provided at the inner face of the end thereof with a sleeve 17 for guiding the rod 16 linearly moving, an oil seal 18 for preventing contamination from penetrating from the outer periphery of the rod 16, and an annular stopper 19 for restricting the linear movement of the rod 16.

The converting structure 31 includes a threaded part 4a of the shaft 4, a resin guide member 20 disposed at the base end of the rod 16 and coupled with the threaded part 4a, and a metallic stopper 21 for restricting the linear movement of the rod 16 toward the motor body 3 side. The guide member 20 moves along the axis of the shaft 4 with the rotation of the shaft 4.

In the stepping motor 100 as an electromagnetic device having the above-described configuration, when electrical current is applied via the external connectors 25, the coils 7 are excited, thereby rotating the rotor 6 and the shaft 4 as a unit. The shaft 4 is coupled with the guide member 20 at the threaded part 4a of the shaft 4, and the rotational movement of the guide member 20 is restricted, whereby the rotational movement of the shaft 4 is converted into the linear movement of the guide member 20 and the rod 16.

By the linear movement of the rod 16 in both directions, a transmission control valve (not shown) disposed in the transmission case is opened and closed, whereby the ratio of rotational speeds between a driving shaft and an engine shaft varies.

In the stepping motor 100, the cover member 52 encloses the coils 7, whereby the cover member 52 protects the coils 7 from molding pressure to be directly applied thereto when injection-molding the housing 12. Therefore, the risk of damages to the outer coating of the conductor due to flashes formed on the bobbin 50 is reduced, whereby the risk of short circuits and disconnection in the conductor is reduced, the short circuits and disconnection being caused by dissolution of copper into the oil from copper wires of the conductor due to a potential gradient between the wires.

Second Embodiment

According to a second embodiment of the present invention, a bobbin is made of a polytetrafluoroethylene. The bobbin has a smooth surface, thereby reducing friction between the bobbin and an outer coating of a conductor, whereby the risk of damages to the outer coating due to friction is reduced when a coil is formed by winding the conductor on the bobbin. The bobbin is not adhesive to the outer coating. Therefore, an adhesive force to thermoweld the conductor on the bobbin at the outer coating thereof is reduced, whereby the thermal stress produced between the bobbin and the outer coating due to the difference of materials between these components is reduced, thereby reducing risk of damages to the outer coating due to a thermal stress.

Damages to the outer coating of the conductor can be suppressed by applying silicon or an oil to the surface of the bobbin so as to have lubricating characteristics.

Third Embodiment

Figure 3:
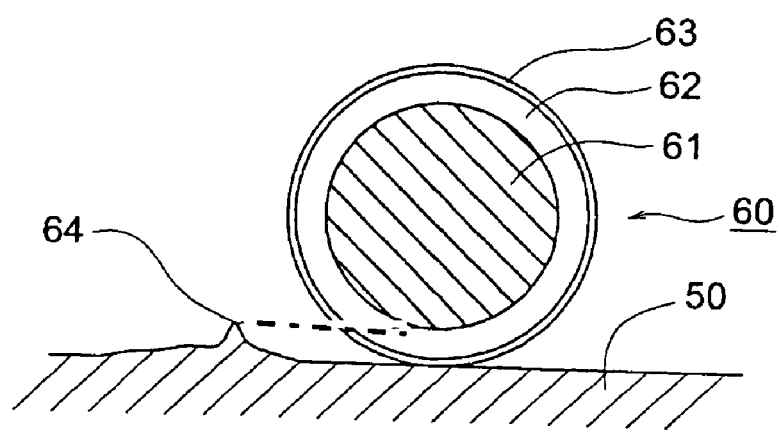
FIG. 3 is a critical sectional view of a stepping motor according to a third embodiment of the present invention.
Figure 4:
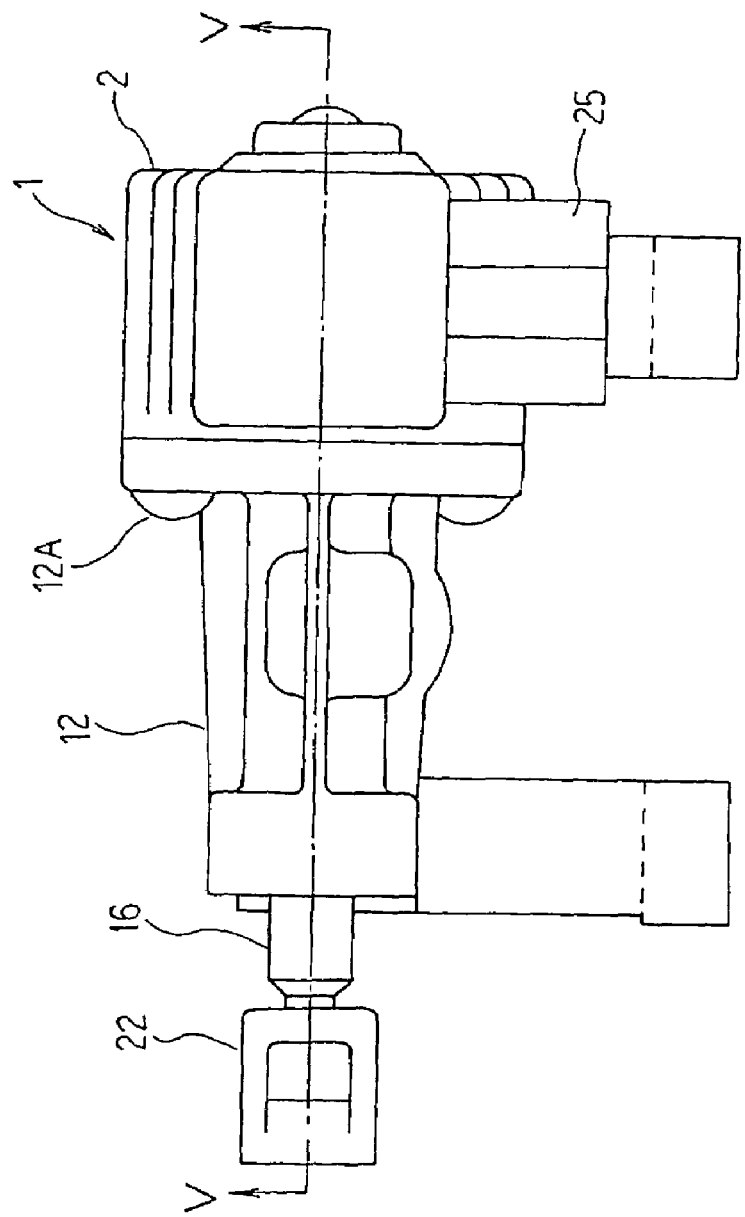
FIG. 4 is a plan view of a known stepping motor.
Figure 5:
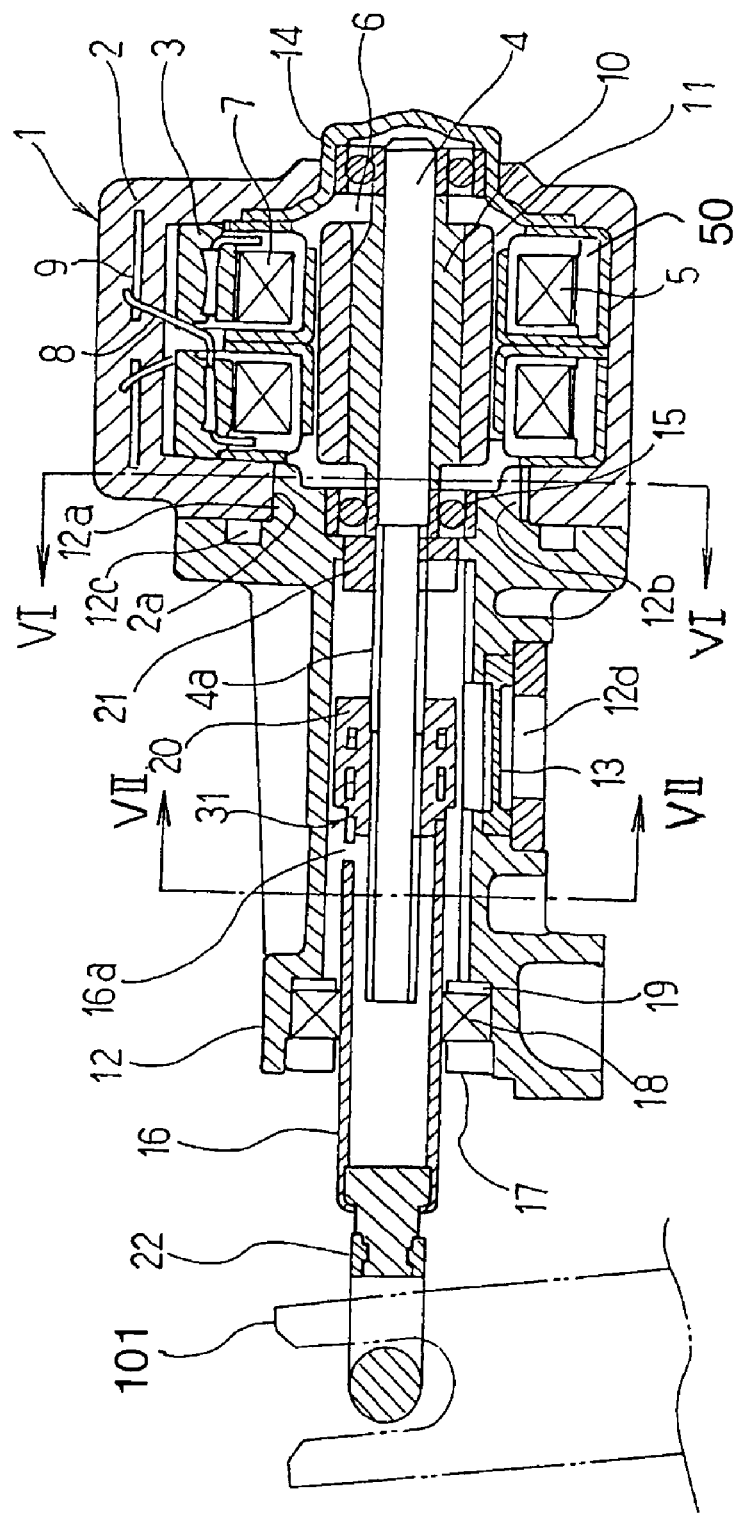
FIG. 5 is a sectional view of the known stepping motor shown in FIG. 4 along a line V—V.
Figure 6:
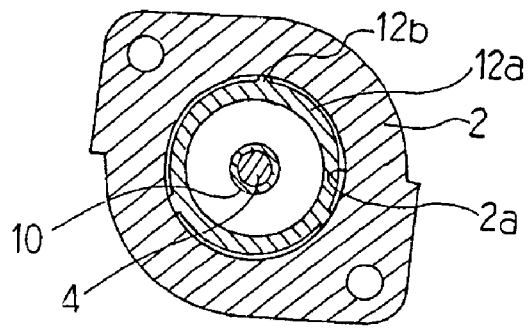
FIG. 6 is a sectional view of the known stepping motor shown in FIG. 5 along a line VI—VI.
Figure 7:
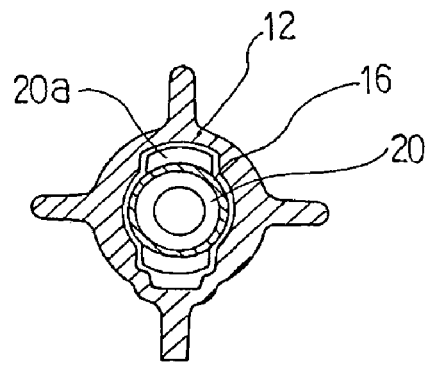
FIG. 7 is a sectional view of the known stepping motor shown in FIG. 5 along a line VII—VII.
Figure 8:
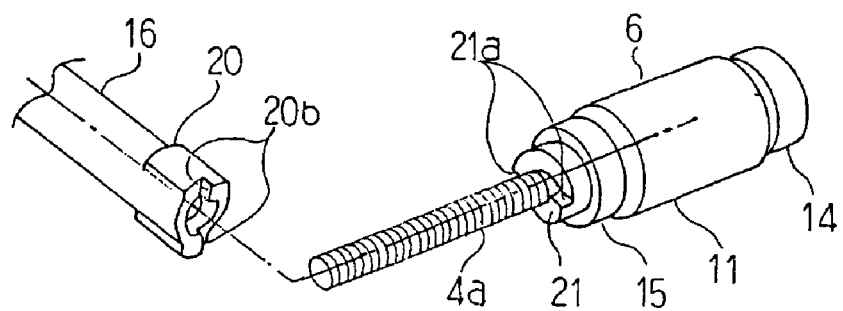
FIG. 8 is a perspective view of a critical portion of the known stepping motor shown in FIG. 4.

FIG. 3 is a sectional view of a critical portion of a stepping motor as an electromagnetic device according to a third embodiment of the present invention. A conductor 60 includes a copper wire 61 coated with an outer coating. The outer coating includes an insulative layer 62 of an enamel and a welding layer 63 of a thermoset epoxy deposited on the insulative layer 62. The welding layer 63 serves for bonding the adjacent conductors 60 to each other.

The thickness of the outer coating is set to a value exceeding the size of a flash 64 formed on a bobbin 50. The size of the flash 64 does not generally exceed 0.01 mm. Therefore, the thickness of the outer coating is set to 0.01 mm.

According to the third embodiment, the thickness of the outer coating of the conductor 60 is greater than the size of the flash 64 of the bobbin 50, whereby the tip of the flash 64 does not reach the copper wire 61 when winding the conductor 60 around the bobbin 50, thereby reducing risk of damages to the outer coating of the conductor 60.

Therefore, in the stepping motor dipped in oil containing sulfur and sulfur compounds, the risk of short circuits and disconnection in the conductor 60 is reduced, the short circuits and disconnection occurring due to dissolution of copper arising due to potential gradient between the adjacent conductors 60 caused by a chemical reaction between the sulfur and sulfur compounds and the copper wire 61 at a damaged portion of the outer coating, the sulfur and sulfur compounds penetrating into the conductor 60 through the damaged portion of the outer coating of the conductor 60.

In the stepping motor according to the first and second embodiments, the thickness of the outer coating of the conductor may be set to a value exceeding the size of the flash, whereby the risk of damages to the outer coating of the conductor is more reduced, thereby increasing resistance of the conductor against short circuits and disconnection.

Although in the first, second, and third embodiments, a stepping motor is used as an electromagnetic device, the present invention is not limited to a stepping motor. The present invention is also applied to, for example, a transmission control valve (a solenoid valve) for controlling a transmission, in which oil flow or oil pressure is controlled by restricting oil paths by using a movable valve which is driven by an electromagnetic force generated in a coil including a conductor wound around a bobbin, thereby varying the ratio of rotational speeds between a driving shaft and an engine shaft.

As described above, according to one aspect of the present invention, an electromagnetic device used in a case containing oil comprises: an electromagnetic device body including a coil formed with a conductor wound around a bobbin and a cover member enclosing the coil; and a cover for covering the electromagnetic device body, wherein the cover member protects the coil from being directly subjected to molding pressure when the cover is formed by injection molding, by covering the coil. Therefore, the electromagnetic device body is not directly subjected to a large molding pressure when molding a cover by injection-molding, whereby the risk of damages to an outer coating of the conductor due to the molding pressure is reduced, thereby increasing resistance of the conductor against short circuits and disconnection.

According to another aspect of the present invention, an electromagnetic device used in a case containing oil comprises: a bobbin; and a conductor wound around the bobbin and coated with an outer coating, wherein the bobbin is composed of a material having lubricating characteristics with respect to the material of the outer coating. Therefore, the friction produced between the bobbin and the conductor is reduced, thereby reducing risk of damages to the outer coating when forming the coil by winding the conductor around the bobbin, whereby the resistance of the conductor against short circuits and disconnection is increased. Also, the thermal stress, which is generated due to adhesion between the adjacent conductors by being thermowelded at the outer coating after the conductor being wound around the bobbin, is reduced, thereby suppressing damages to the outer coating, whereby the resistance of the conductor against short circuits and disconnection is increased.

According to one form of the present invention, a bobbin may be made of a polytetrafluoroethylene. Therefore, the resistance of the conductor against short circuits and disconnection is increased at a low cost.

According to still another aspect of the present invention, an electromagnetic device used in a case containing oil comprises: a bobbin; a conductor wound around the bobbin and coated with an outer coating; and a material having lubricating characteristics deposited on a surface of the bobbin. Therefore, the resistance of the conductor against short circuits and disconnection is increased with a simple configuration.

According to another form of the present invention, a material having lubricating characteristics may be silicon. Therefore, the resistance of the conductor against short circuits and disconnection is increased at a low cost.

According to still another form of the present invention, the material having lubricating characteristics may be an oil. Therefore, the resistance of the conductor against short circuits and disconnection is increased at a low cost.

According to still another aspect of the present invention, an electromagnetic device used in a case containing oil, comprises: a bobbin; and a conductor wound around the bobbin and coated with an outer coating, wherein the thickness of the outer coating of the conductor exceeds the size of a flash produced on the bobbin. Therefore, the tips of flashes do not reach the conductor when the conductor is wound around the bobbin, thereby suppressing damages to the outer coating and increasing resistance of the conductor against short circuits and disconnection.

What is claimed:

1. An electromagnetic device used in a case containing oil, said electromagnetic device comprising:

an electromagnetic device body including a coil formed with a conductor wound around a bobbin and a cover member enclosing said coil; and a cover molded around said electromagnetic device body with a molding pressure, said cover member protecting said coil from said molding pressure when said cover is molded around said cover member;

wherein said bobbin is composed of a material having lubricating characteristics, wherein the conductor is coated with an outer coating, and wherein said outer coating comprises:
- an insulating layer which is made of enamel formed over the conductor; and
- a welding layer which is made of thermoset epoxy formed over the insulating layer.

2. An electromagnetic device according to claim 1, wherein the thickness of an outer coating of said conductor exceeds the size of a flash produced on said bobbin.

3. An electromagnetic device according to claim 1, wherein the electromagnetic device is a motor.

4. An electromagnetic device according to claim 1, wherein the electromagnetic device is a transmission control valve.

5. An electromagnetic device according to claim 1, wherein the electromagnetic device is used in a case containing oil.

6. An electromagnetic device according to claim 1, wherein a tip of a flash of the bobbin does not reach the conductor due to a thickness of said outer coating.

7. An electromagnetic device according to claim 1, further comprising:
- a pair of coils opposing each other,
- wherein said pair of coils are enclosed by the cover member.

8. An electromagnetic device according to claim 1, wherein said cover member is cylindrical in shape.

9. An electromagnetic device according to claim 1, further comprising:
- a plurality of adjacent conductors, wherein said welding layer bonds said plurality of adjacent conductors to each other.

10. The electromagnetic device according to claim 1, wherein the bobbin is lubricated with one of silicon and oil.

11. The electromagnetic device according to claim 1, wherein the bobbin comprises polytetrafluoroethylene.

12. An electromagnetic device used in a case containing oil, said electromagnetic device comprising:

an electromagnetic device body including a coil formed with a conductor wound around a bobbin and a cover member enclosing said coil; and a cover molded around said electromagnetic device body with a molding pressure, wherein said cover member comprises a means for protecting said coil from being directly subjected to molding pressure when said cover is formed by injection molding, by covering said coil;

wherein said bobbin is composed of a material having lubricating characteristics, wherein the conductor is coated with an outer coating, and wherein the thickness of said outer coating of said conductor exceeds the size of a flash produced on said bobbin;

wherein said outer coating comprises:
- an insulating layer which is made of enamel formed over the conductor; and
- a welding layer which is made of thermoset epoxy formed over the insulating layer.

13. An electromagnetic device used in a case containing oil, said electromagnetic device comprising:

an electromagnetic device body including a coil formed with a conductor wound around a bobbin and a cover member enclosing said coil; and a cover molded around said electromagnetic device body with a molding pressure, said cover member having a material strength sufficient to protect said coil from being directly subjected to said molding pressure when said cover is molded around the cover member;

wherein said bobbin is composed of a material having lubricating characteristics, wherein the conductor is coated with an outer coating, wherein the thickness of said outer coating of said conductor exceeds the size of a flash produced on said bobbin;

wherein said outer coating comprises:
- an insulating layer which is made of enamel formed over the conductor; and
- a welding layer which is made of thermoset epoxy formed over the insulating layer.

* * * * *